United States Patent [19]

Stumm

[11] Patent Number: 5,166,476
[45] Date of Patent: Nov. 24, 1992

[54] ELECTRIC JUNCTION BOX/OUTLET

[76] Inventor: Eric Stumm, 5611 Dalwood Way NW, Calgary, Alberta T3A 1S6, Canada

[21] Appl. No.: 584,088

[22] Filed: Sep. 18, 1990

[51] Int. Cl.$^5$ .............................................. H02G 3/10
[52] U.S. Cl. ..................................... 174/65 R; 174/48
[58] Field of Search ................... 174/48, 49, 51, 54, 174/58, 65 R; 220/3.8

[56] References Cited

U.S. PATENT DOCUMENTS

| | | | |
|---|---|---|---|
| 1,837,955 | 12/1931 | Ely et al. | 174/54 |
| 2,667,368 | 1/1954 | Ferguson | 174/65 R X |
| 2,671,821 | 3/1954 | Zientowski et al. | 174/54 |
| 2,927,149 | 3/1960 | Kern, Jr. | 174/65 R |
| 3,084,958 | 4/1963 | Appleton | 174/65 R X |
| 3,197,548 | 7/1965 | Weitzman et al. | 174/58 |
| 3,356,840 | 12/1967 | Cohen | 174/54 |
| 4,051,322 | 9/1977 | Park et al. | 174/65 R |

Primary Examiner—Leo P. Picard
Assistant Examiner—Tone D. A.
Attorney, Agent, or Firm—Jerry T. Kearns

[57] ABSTRACT

A junction box for connection to the electrical wiring of a building structure includes an inner panel adapted for mounting to a surface of a building structure and an outer panel substantially parallel to and spaced from the inner panel and adapted for mounting an electrical device thereon. Side panel means bridge the inner and outer panels to provide an enclosure therebetween. The inner panel is adapted to permit passage of an electrical conduit therethrough, and the outer panel is adapted to permit access to the electrical conduit for connection of an electrical device thereto.

8 Claims, 2 Drawing Sheets

ELECTRIC JUNCTION BOX/OUTLET

The present invention relates to field of electrical apparatus. In particular, the present invention provides a novel surface mounted junction box for use in mounting electrical outlets or fixtures to wall surfaces.

When a building is wired for the provision of electrical power therein, the wiring is installed between the exterior and interior wall surfaces, beneath floors, above ceilings and between the surfaces in interior walls. Installation of wiring is carried out after framing, and before walls are installed on both sides of erected framing. At those points where it is desired to provide an electrical receptacle, wiring for ceiling lighting, or the like, a junction box, usually made from steel, is securely fastened to a frame member, and connected to the wiring. When wall surfaces, e.g., drywall, is later installed, appropriate apertures are cut to provide access to the junction boxes. This type of installation is well suited to applications such as new home construction or extensive renovation involving demolition and reconstruction of walls. In both of those situations, there is easy access to the interior spaces of walls.

However, where it is desired to install an outlet or lighting fixture on a finished wall, it has been necessary to cut a large hole in the wall, install the junction box on a framing member, and then repair the wall around the area of installation. It will be appreciated that this is a time consuming operation, and requires considerable skill to achieve an acceptable result. Also, even in new construction, in those situations where a finishing surface of a wall is thick or difficult to work with, as for instance a brick wall, it is often difficult to conveniently mount a receptacle to a wall while achieving an acceptable finished appearance. In the case of a brick wall, there is often too much depth between the exterior of the wall and the interior frame to mount a box on the frame and access it on the exterior.

The object of the present invention is to provide an electrical junction box that may be mounted on a wall surface without the need of accessing the internal framing thereof. A further object of the present invention is to provide a junction box that may easily be attached to a thick or hard wall such as a brick or masonry wall to provide an electrical receptacle, light mixture mount or the like thereon.

In a broad aspect, the present invention relates to a junction box for connection to the electrical wiring of a building structure including: (i) an inner panel adapted for mounting to a surface of a building structure; (ii) an outer panel substantially parallel to and spaced from said inner panel and adapted for mounting an electrical device thereon; (iii) side panel means bridging said inner and outer panels to provide an enclosure therebetween; said inner panel being adapted to permit passage of an electrical conduit therethrough, and said outer panel being adapted to permit access to said electrical conduit for connection of an electrical device thereto.

In drawings which illustrate the present invention by way of example:

Figure 1:
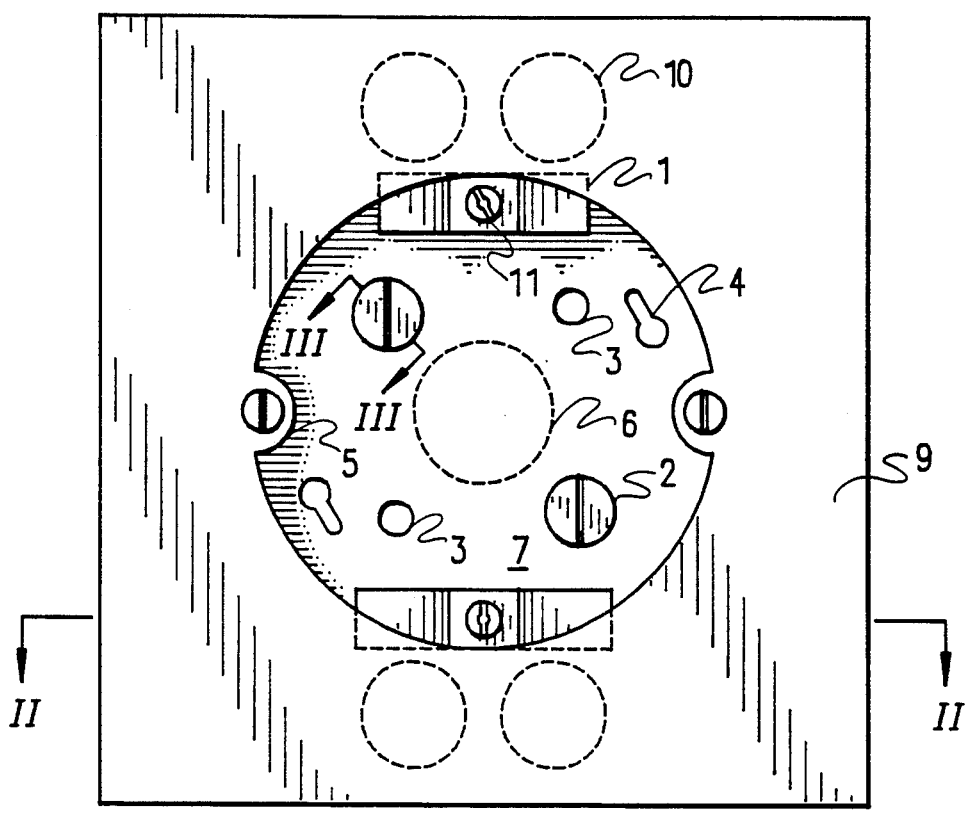
FIG. 1 is a front view of a fixture box according to the present invention.
Figure 2:
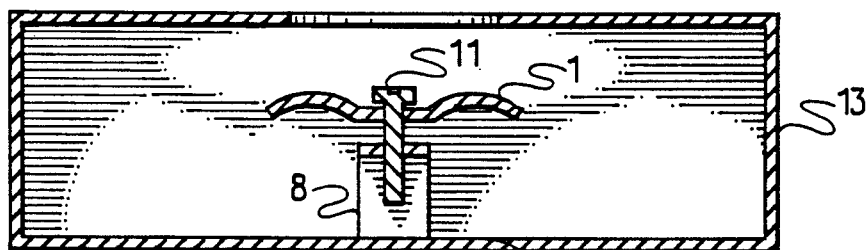
FIG. 2 is a view through line II—II of FIG. 1.
Figure 3:
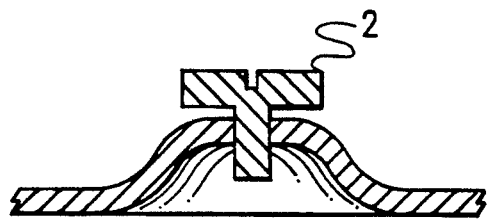
FIG. 3 is a view through line III—III of FIG. 1.
Figure 4:
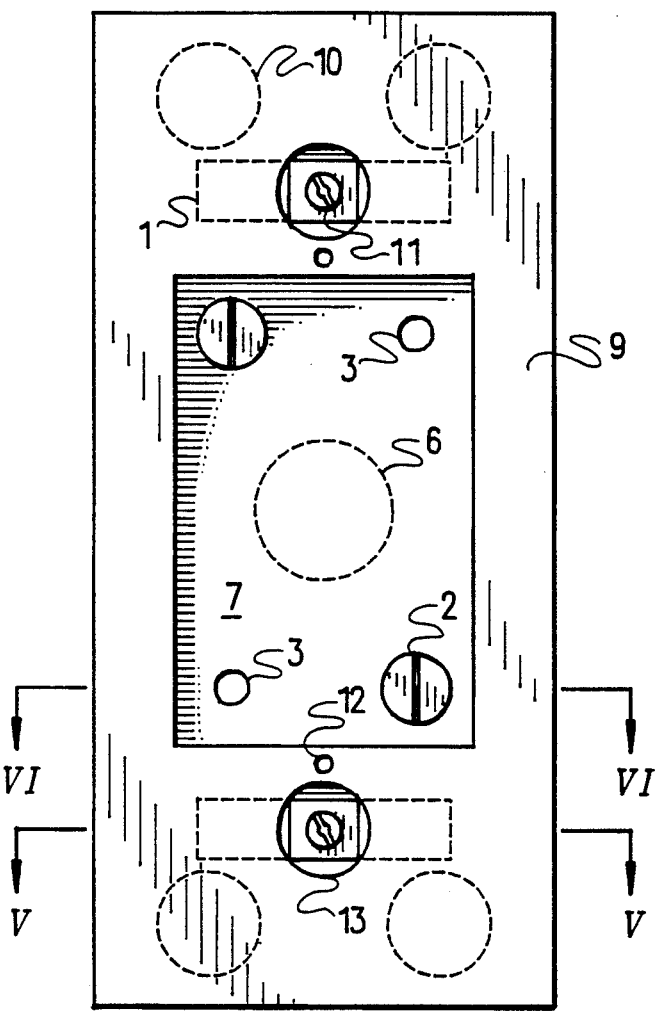
FIG. 4 is a front view of an outlet box according to the present invention.
Figure 5:
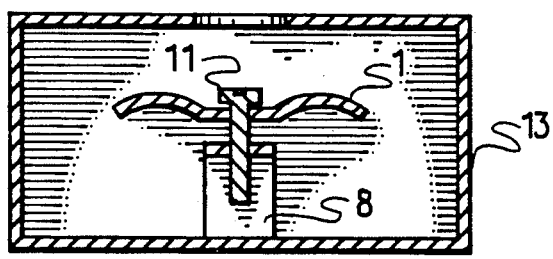
FIG. 5 is a view through line V—V of FIG. 4.
Figure 6:
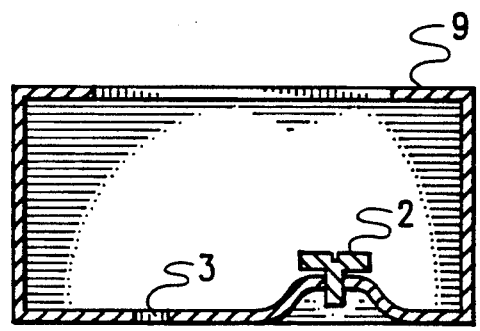
FIG. 6 is a view through line VI—VI of FIG. 4.

Referring now to FIGS. 1, 2 and 3, a hollow fixture box B according to the present invention has a flat rear surface 7 for mounting directly against a wall surface. A pair of key-hole apertures 4 are formed in the rear surface of the box, for removable attachment of the box to a surface by screws which may be screwed into framing studs or anchors in a wall or ceiling. Holes 4 are accessible from the front of the box for tightening of the said screws by provision of a large generally circular aperture in the front surface 9 of the box. This aperture also provides access to wiring within the box. The front and rear surfaces of the box are joined by side panels 13, which form an enclosure to accommodate access cable and cable connections etc.

Cable is led into and exits the box at knock-outs 10 which are provided at the top and bottom of the box. Adjacent cable entry knock-outs 10, clamps 1 are provided on clamp mounts 8 which are raised from the interior of the box. Cable which is led into the box is slipped under clamps 1, and then screw 11 is tightened into clamp mount 8 to secure the wire in place. Clamp screw 11 also functions as a ground screw. Additional ground screws 2 are located on raised portions of the rear surface of the box, as can be seen from FIGS. 1 and 3. It will be appreciated, then, that a metal plate will connect ground screws 2 and 11 if the box of the present invention is fabricated from plastic. In this regard, it will be understood that the box of the present invention may be fabricated from any suitable material, which will be a matter of choice for one skilled in the art.

Additional screw holes 3 are provided for increased flexibility in mounting the box of the present invention. Moreover, an additional cable knock out 6 is provided so that additional cable may be led into the box.

On the front surface of the box, fixture bar hanger holes 5 are provided so that a standard light fixture bar hanger may easily be attached to the box of the present invention.

Between the front and rear surfaces of the box there is a hollow space to accommodate cable and wiring.

To install the box of the present invention, one need only lead a cable through a wall, without the necessity of cutting a hole in a wall for mounting a box therein. The appropriate cable knock out is removed, and the cable led into the box and clamped into place. The ground wire of the cable is screwed to a ground connection 8, 2, in the box. The box is then securely fastened by screws to the outer surface of the wall, and it is ready for use. It will be appreciated that in the case of a brick or masonry wall, installation requires only that a cable hole and anchor holes be drilled through the wall. Extensive masonry work is not required to set the box in place. It is, however, recommended to caulk around the installed box.

Referring now to the remainder of the figures, an outlet box is shown. The structures and principles of it are substantially as described above. The only difference being the size and shape thereof, and the provision of an additional access aperture 13 at the top and bottom of the box for accessing clamp screws 8. As well, bar hanger screw holes are replaced with receptacle attachment screw holes 12. Mounting holes 4 are not provided, mounting being done via holes 3.

It will be appreciated that access apertures 13 will be covered by a receptacle plate after a receptacle has been installed in the box.

It is to be understood that the examples described above are not meant to limit the scope of the present invention. It is expected that numerous variants will be obvious to the person skilled in the electrical wiring apparatus design field, without any departure from the spirit of the present invention. The appended claims, properly construed, form the only limitation upon the scope of the present invention.

We claim:

1. A junction box for connection to the electrical wiring of a building structure, comprising:

an inner panel including at least one mounting hole adapted to receive a fastener for mounting said inner panel to a surface of a building structure;

at least one electrical cable aperture formed through said inner panel;

an outer panel substantially parallel to and spaced from said inner panel and including an enlarged substantially centrally located access aperture, said outer panel providing a substantially planar surface extending substantially outwardly from peripheral edges of said access aperture, whereby said access aperture is surrounded by said planar surface;

a spaced, substantially parallel, opposed pair of side panels bridging said inner and outer panels to provide an enclosure therebetween; and means for mounting an electrical device in substantial alignment with said access aperture, such that electrical connections for said electrical device may be disposed within said enclosure and a mounting surface of said electrical device may be disposed entirely in substantially sealing engagement with said planar surface, whereby said electrical device is isolated from said surface of said building structure.

2. The junction box of claim 1, further comprising clamping means in said enclosure for securing electrical cabling received through said electrical cable aperture to said inner panel.

3. The junction box of claim 2, wherein said clamping means comprises:

an upstanding clamp mount extending from said inner panel toward said outer panel;

a substantially transverse clamping bar; and a clamping screw securing said clamping bar to said upstanding clamp mount.

4. The junction box of claim 1, wherein said access aperture is substantially round.

5. The junction box of claim 4, wherein said outer panel is adapted and dimensioned for attachment of a light fixture thereto.

6. The junction box of claim 1, wherein said access aperture is substantially rectangular and dimensional for reception of an electrical outlet.

7. The junction box of claim 1, wherein said mounting hole is key-hole shaped.

8. The junction box of claim 1, further comprising at least one knock-out in said inner panel for allowing additional electrical cables into said enclosure.

* * * * *